United States Patent [19]
Butzin et al.

[11] Patent Number: 5,014,439
[45] Date of Patent: May 14, 1991

[54] QUALITY ASSURANCE APPARATUS FOR DIMENSIONALLY INSPECTING ELONGATED COMPONENTS

[75] Inventors: Donald F. Butzin, Wilmington, N.C.; George W. Tunnell, Foster City, Calif.; Harold B. King, Jr., Wrightsville Beach; Frederick C. Schoenig, Jr., Wilmington, both of N.C.

[73] Assignee: General Electric Company, San Jose, Calif.

[21] Appl. No.: 477,372

[22] Filed: Feb. 9, 1990

[51] Int. Cl.⁵ ............................................. G01B 5/04
[52] U.S. Cl. ...................................... 33/533; 33/502; 33/549; 33/551
[58] Field of Search ................. 33/502, 533, 549, 551, 33/552, 554, 553; 376/245, 258, 259, 249, 248

[56] References Cited

U.S. PATENT DOCUMENTS

| | | | |
|---|---|---|---|
| 3,621,580 | 11/1971 | Tovaglieri | 33/502 X |
| 4,197,652 | 4/1980 | Qurnell et al. | 33/502 |
| 4,274,205 | 6/1981 | Starr et al. | 33/502 |
| 4,728,483 | 3/1988 | Ahmed et al. | 33/502 X |

Primary Examiner—Harry N. Haroian
Attorney, Agent, or Firm—Robert R. Schroeder

[57] ABSTRACT

To measure the dimensional characteristics of elongated flow channels for nuclear fuel rod assemblies at the manufacturing site, an upender is utilized to swing a flow channel from a horizontal loading orientation to an upright pre-measurement position and then to shift the flow channel laterally into a measurement position where it is engaged and held by reciprocatingly mounted upper and lower endplugs while its dimensional characteristics are acquired by a measurement carrige mounted for vertical scanning movement along the entire flow channel length.

10 Claims, 6 Drawing Sheets

QUALITY ASSURANCE APPARATUS FOR DIMENSIONALLY INSPECTING ELONGATED COMPONENTS

The present invention relates to apparatus for handling and dimensionally inspecting elongated components for satisfaction of quality assurance standards.

BACKGROUND OF THE INVENTION

There are numerous components of industrial and utility equipment whose dimensional characteristics are of a critical nature and thus must be manufactured to extremely tight dimensional tolerances. Consequently, the dimensions of such components must be scrupulously inspected for quality assurance in the factory before being assembled into the equipment. A notable example of such a critical component is the flow channel of a nuclear fuel rod assembly or bundle, such as disclosed in U.S. Pat. No. 3,689,358. These channels are elongated, square, tubular components which may measure 13 centimeters on each side and on the order of 4 meters in length. It is necessary to assure that these flow channels are manufactured with their outer side surfaces sufficiently flat over their entire length so as not to obstruct the insertion of control rods between fuel assemblies in a nuclear reactor operating environment. The interior channel dimensions are also of critical concern in order to properly accept the assembly of fuel rods and spacers therein. Thus, the important dimensional characteristics of a flow channel include face or side bulge, channel width, non-square cross section at any point along its length, longitudinal bow and twist. Dimensional tolerances over the channel length may be on the order of plus/minus 0.127 mm.

Portable apparatus for measuring such dimensional characteristics of flow channels at a reactor site are disclosed in U.S. Pat. Nos. 4,197,652 and 4,274,205. An improved flow channel dimensional inspection apparatus is disclosed in the commonly assigned, copending application of Butzin, et al. entitled "Device for Dimensional Characterizing Elongated Components", Ser. No. 336,999, filed Apr. 12, 1989. While it is important to measure the dimensional characteristics of flow channels at the reactor site after they have been put into service to determine any unacceptable deviations from specification, it is equally important to determine at the factory site that these channels are manufactured strictly to specification in the first instance.

SUMMARY OF THE INVENTION

It is accordingly an object of the present invention to provide factory quality assurance apparatus for dimensionally inspecting elongated components on an expedited basis.

A further object is to provide apparatus of the above-character, which includes improved provisions for mechanizing the handling of such elongated components pursuant to the performance of quality assurance inspections thereof.

An additional object is to provide quality assurance inspection apparatus of the above character, wherein component handling and dimensional measurement acquisition is accomplished on a highly automated basis.

A further object is to provide quality assurance apparatus of the above-character, which is economical in construction, convenient to operate with minimal personnel, capable of a relatively high throughput, and reliable over a long service life.

Other objects of the invention will in part be obvious and in part appear hereinafter.

In accordance with the present invention, there is provided quality assurance apparatus for expeditiously acquiring the dimensional characteristics of elongated components, such as the flow channels in nuclear fuel rod assemblies. The apparatus includes a vertical column mounting a measurement carriage for scanning movement relative to a flow channel releasably held in an upright measurement position by the engagements therewith of upper and lower centering members. The carriage bears a plurality of sensors for rapidly acquiring the dimensional characteristics of the flow channel during carriage scanning motion between the centering members.

To readily handle each flow channel to and from the measurement position, the apparatus further includes a mechanized upender on which a flow channel is loaded and fixtured in a horizontal orientation. The upender swings the fixtured channel to an upright orientation and then shifts it laterally into the measurement position. Upon engagements of the channel by the centering members, the upender releases the channel and backs away to clear the way for carriage scanning motion. Once channel measurements have been acquired, the upender moves in to refixture the channel, and the centering members disengage. The channel is swung back into its original horizontal orientation for unloading and subsequent loading of the next channel on the upender.

The invention accordingly comprises the features of construction, combination of elements and arrangement of parts, all as disclosed in the following Detailed Description, and the scope of the invention will be indicated in the appended claims.

DESCRIPTION OF THE DRAWINGS

For a full understanding of the nature and objects of the present invention, reference may be had to the following Detailed Description taken in conjunction with the following drawings, in which.

Corresponding reference numerals refer to like parts throughout the several views of the drawings.

DETAILED DESCRIPTION OF THE INVENTION

Figure 1:
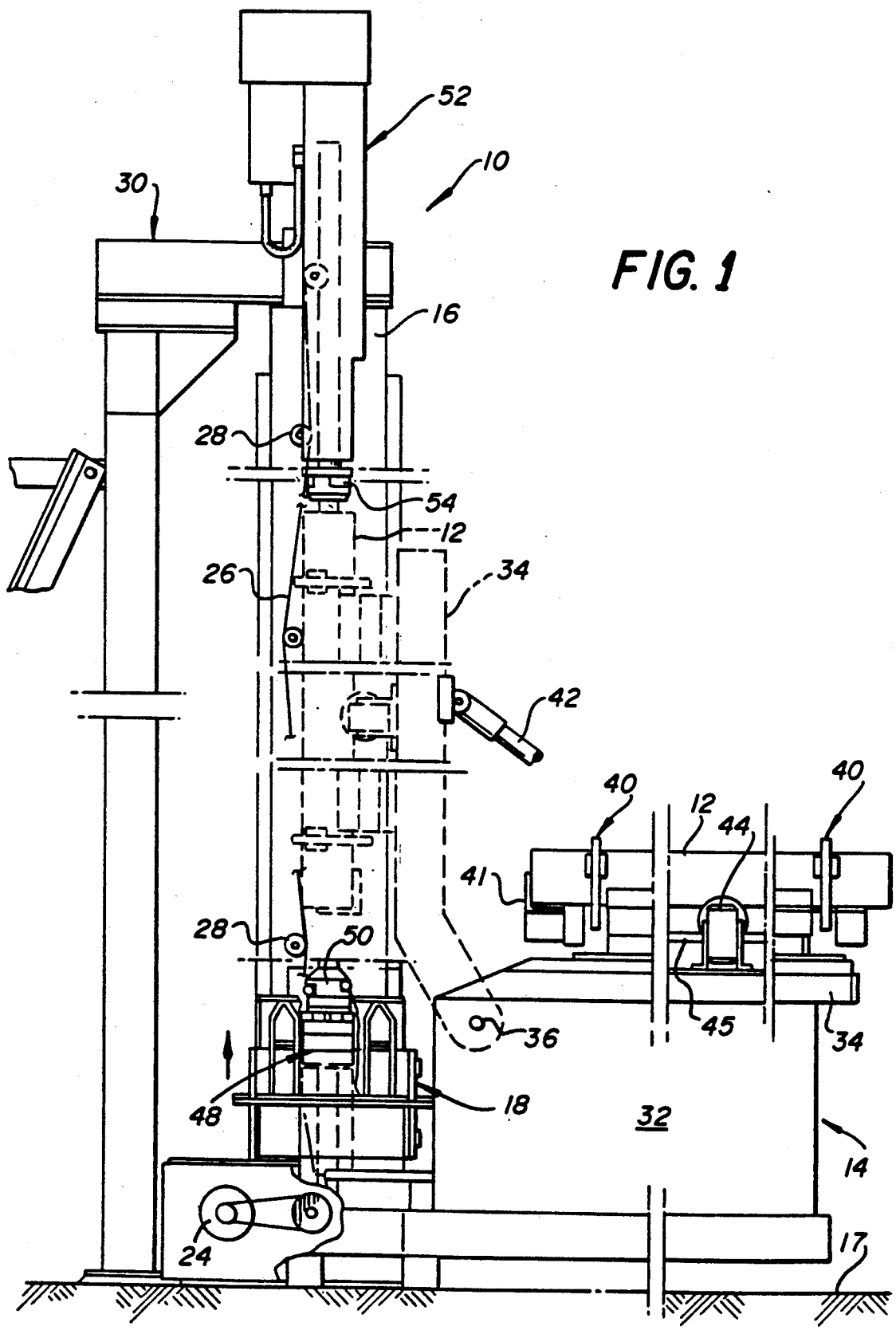
FIG. 1 is side elevational view, partially broken away, of quality assurance apparatus constructed in accordance with the present invention, illustrating an elongated component, such as a flow channel of a nuclear fuel rod assembly, in a horizontal orientation preparatory to dimensional inspection.
Figure 2:
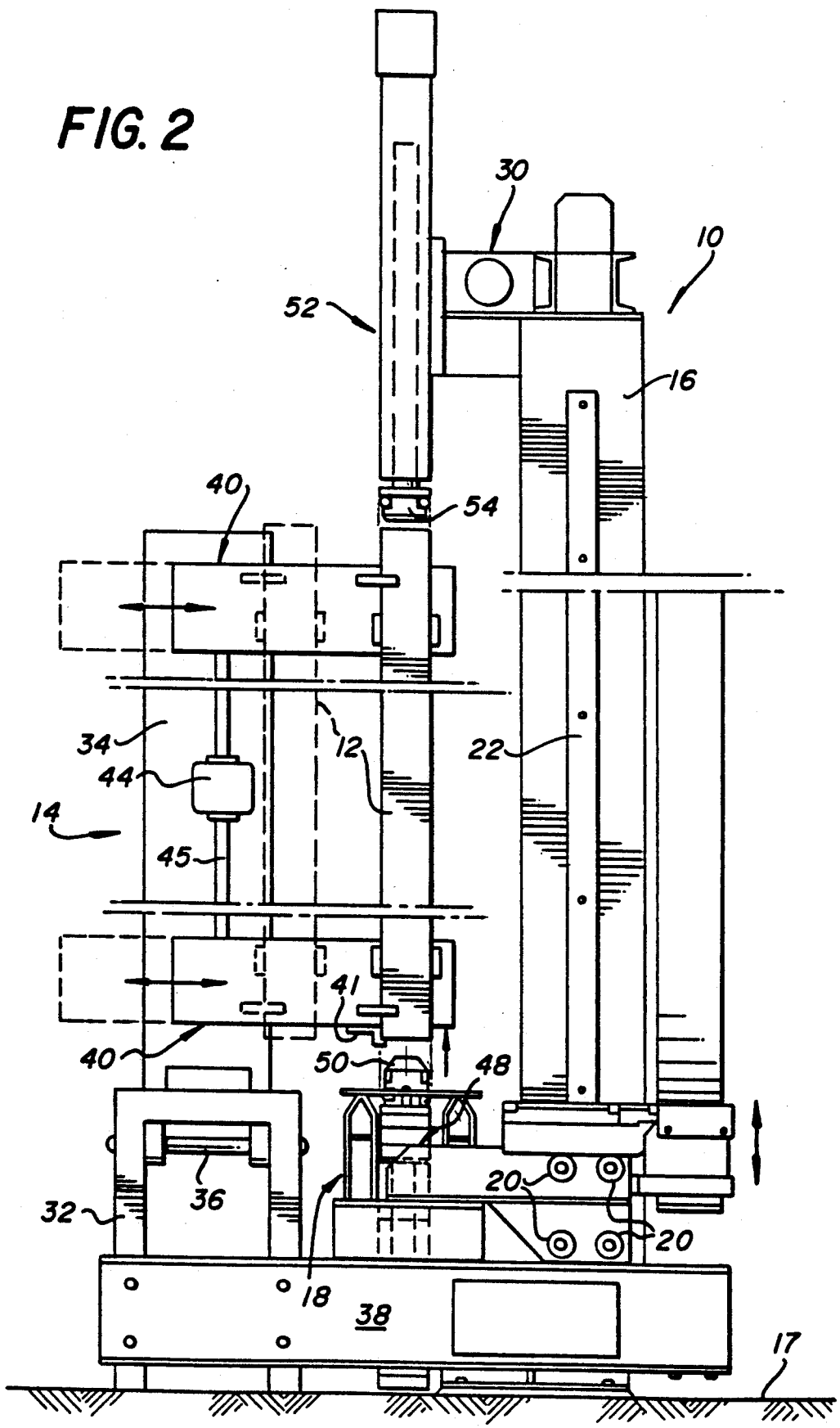
FIG. 2 is a side elevational view, partially broken away, of the quality assurance apparatus of FIG. 1, illustrating a flow channel upended to a vertical measurement position.

The quality assurance apparatus of the present invention for factory inspection of elongated components, such as flow channels to be utilized in nuclear fuel rod assemblies includes, as seen in FIGS. 1 and 2, an inspection assembly, generally indicated at 10, for expeditiously acquiring the dimensions of a flow channel 12 located in a predetermined measurement position and a mechanized upender, generally indicated at 14, for automatically manipulating a flow channel between a horizontal load/unload orientation seen in FIG. 1 and the vertical measurement position shown in FIG. 2. Inspection assembly 10 includes a column 16 anchored at its base to factory floor 17 and mounting a measurement carriage, generally indicated at 18, for vertical scanning movement relative to a flow channel 12 in its measurement position of FIG. 2. This carriage is preferably of the construction disclosed and claimed in the above-cited copending application Ser. No. 336,999, the disclosure of which is specifically incorporated herein by reference. Thus, measurement carriage 18 mounts a plurality of dimension sensors in the form of linear variable differential transformers (LVDT), which are distributed about a rectangular central opening in the carriage through which the flow channel extends. The plungers of the LVDT sensors are equipped with rollers which ride over the exterior surfaces of the flow channel as the carriage scans the entire channel length of four meters more or less. The sensor signal responses provide an accurate indication of the channel dimensional characteristics.

As seen in FIG. 2 herein, carriage vertical scanning motion is supported and precisely guided by the engagements of rollers 20 with opposed, vertically elongated rails 22 mounted by column 16. Scanning motion is motivated by a motor 24 driving an endless chain 26 connected with the carriage and running the height of column 16 on a vertical series of sprockets 28, as seen in FIG. 1. The vertical orientation of the column is maintained by a strongback framework, generally indicated at 30.

Still referring to FIGS. 1 and 2, upender 14 includes a base 32 to which a boom 34 is pivotally connected by a hinge pin 36. Base 32 is rigidly connected with inspection assembly 10 by a beam 38 to maintain the desired positional relationship of the upender to the assembly. Alternatively, base 32 may be anchored to factory floor 17 to fix the upender position relative to the inspection assembly. Boom 34 is equipped with a pair of fixturing mechanisms, generally indicated at 40, for securing a flow channel 12 thereto once it is loaded on the upender in a horizontal orientation, as illustrated in FIG. 1. The longitudinal loaded position of the flow channel is defined by engagement of a channel edge at one end against a stop 41. Suitable means, such as a hydraulic jack (a portion of its piston indicated at 42), is actuated to swing boom 34 upwardly about hinge pin 36, thereby upending the flow channel to a phantom line pre-measurement position seen in FIGS. 1 and 2. A motor 44, carried by the boom, is activated to commonly drive, via shaft 45, fixturing mechanisms 40 from their phantom line to their solid line positions seen in FIG. 2, and thereby laterally shift flow channel from its pre-measurement position into its measurement position. It will be noted that measurement carriage 18 is in its lowermost position so as not to obstruct channel movement into its measurement position. A lower centering mechanism, generally indicated at 48, is then activated to raise a centering member in the form of an endplug 50 into inserted engagement with the lower open end of the channel. An upper centering mechanism, generally indicated at 52, is then activated to lower an endplug 54 into inserted engagement with the upper open end of the channel. These centering mechanisms are fixedly mounted by column 16 or strongback 30 such that their centering endplugs 50 and 54 are in precise vertical alignment. Thus, endplug engagements in the open channel ends serve to establish an accurately repeatable channel measurement position. To this end, the centering endplugs are preferably of the construction disclosed in the above-cited copending application Ser. No. 336,999.

Once a flow channel is established in its measurement position by the centering endplugs, fixturing mechanisms 40 are actuated to release the flow channel and are driven to their phantom line positions in FIG. 2, clearing the way for measurement-taking, vertical scanning motion of measurement carriage 18. After the channel dimensions have been acquired, the measurement carriage is returned to its lowermost position, and fixturing mechanisms 40 return to re-acquire physical control over the flow channel. The centering endplugs can then be withdrawn, and the fixturing mechanisms are retracted to bring the flow channel out to its pre-measurement position. The upender boom 34 is lowered to bring the flow channel to its horizontal load/unload position, from which it can be readily removed and replaced with the next flow channel to be measured.

Figure 3:
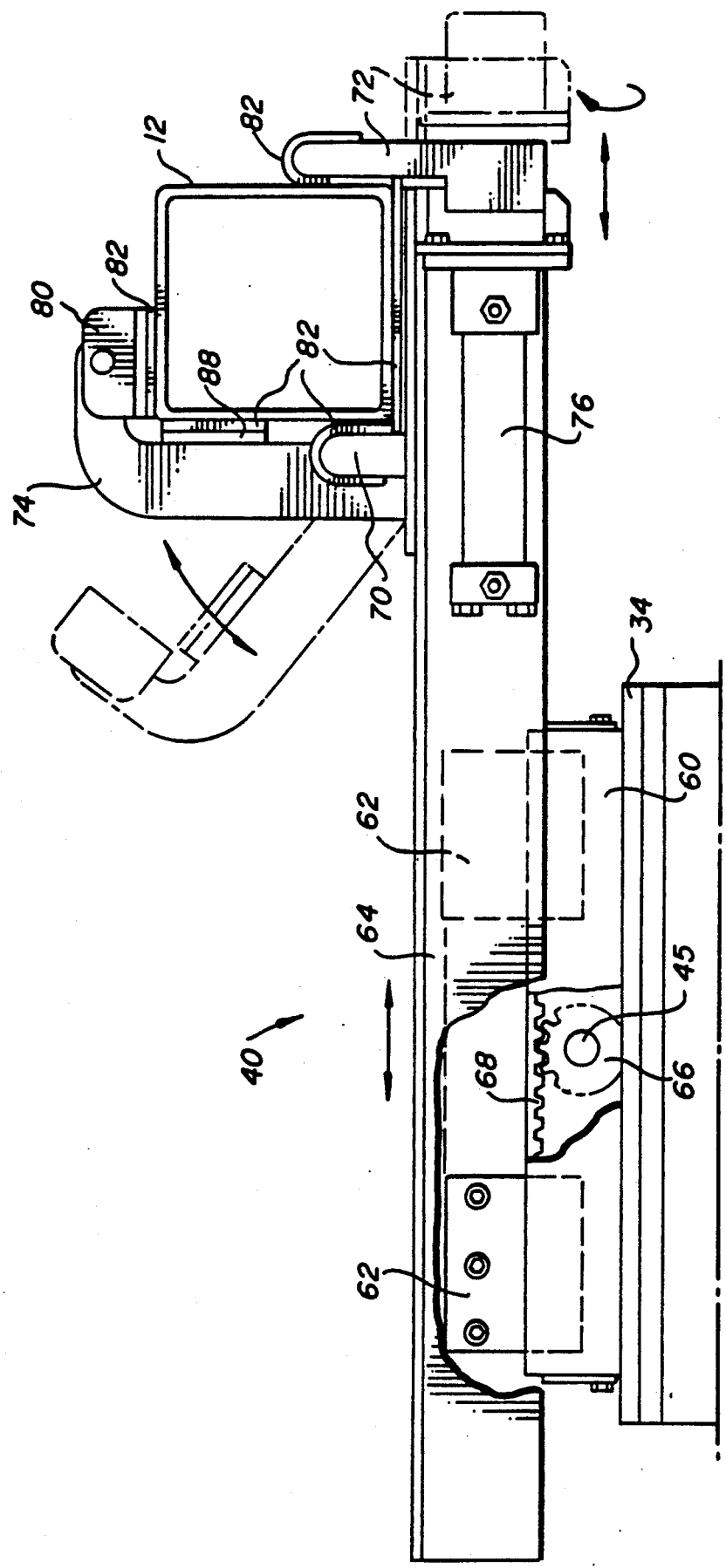
FIG. 3 is a fragmentary side view, partially broken away, of one of the channel fixturing mechanisms utilized in the apparatus of FIG. 1.

Each fixturing mechanism 40 includes, as best seen in FIG. 3, a base 60 affixed to upender boom 34 and, in turn, mounting linear bearings 62 for supporting a slide 64 for reciprocation between channel pre-measurement and measurement positions. A spur gear 66, journalled by base 60 and driven by shaft 45 of motor 44 (FIG. 1 and 2), engages a rack gear 68 carried by slide 64 to produce this reciprocating slide motion. A fixed inner fence 70, and an outer, movable fence 72 are carried by the slide adjacent its right as seen in FIG. 3. A pivotally mounted arm clamp 74 is also carried by the slide adjacent these fences. When a flow channel 12 is to be loaded on upender 14, fence 72 is shifted to an extended and 90° rotated phantom line position by an air cylinder 76, and arm clamp 74 is swung to its phantom line position by double-acting air cylinders 78 seen in FIG. 4. The fixturing mechanisms are thus opened up to readily accommodate the loading placement of a flow channel on slides 64. Air cylinder 76 is actuated to uprightingly rotate and then retract fence 72, such as to clampingly position the flow channel between it and fixed fence 70. As will be further described in connection with FIG. 4, arm clamp 74 is swung to its solid line position to bring a foot 80, pivotally carried at the free end of the arm clamp, into overlying, clamping engagement with the flow channel, thus securing it to boom 34 for upending and measurement positioning. Preferably, all channel-engaging surfaces of the fixturing mechanisms are covered with a suitable material 82 to prevent scratching of the channel surfaces.

Figure 4:
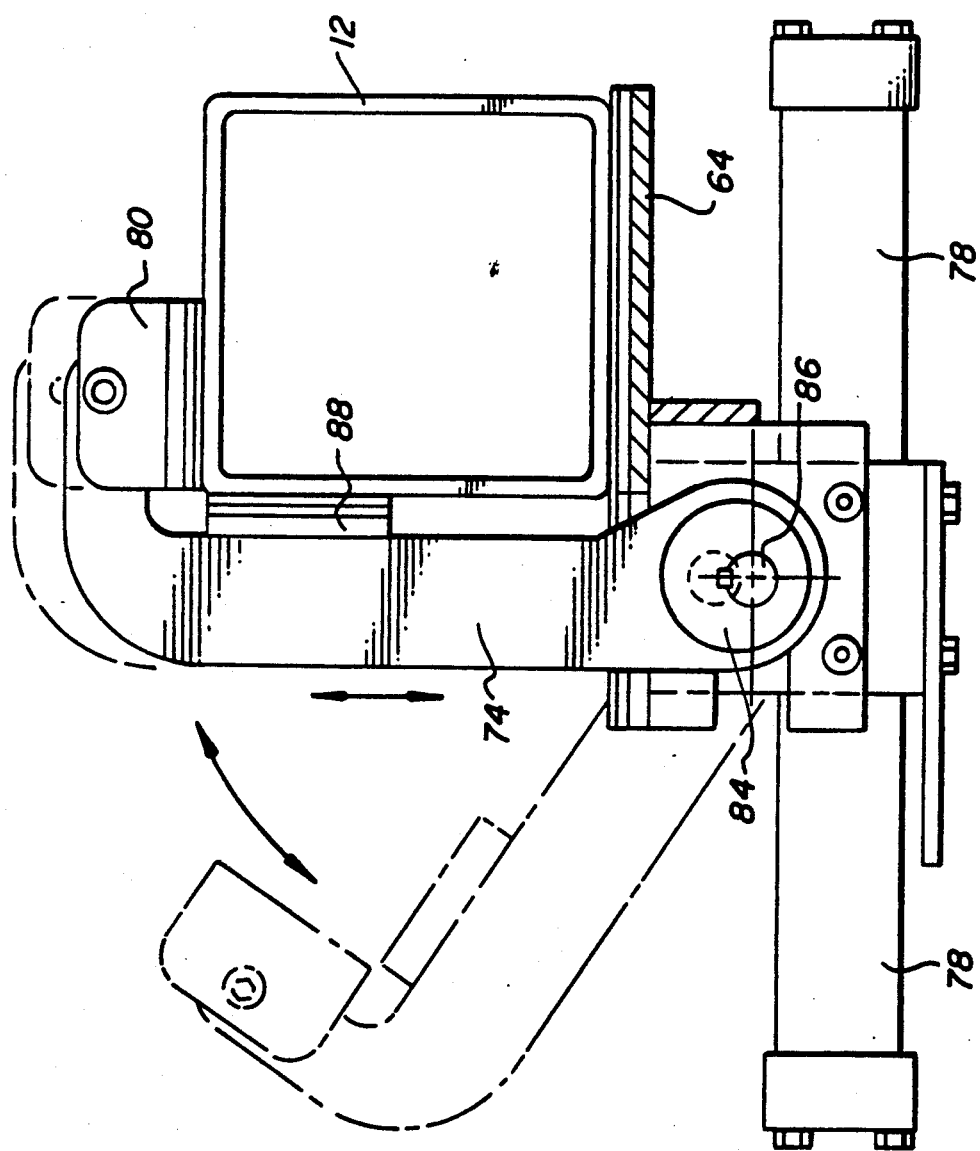
FIG. 4 is a fragmentary opposite side view of a portion of the fixturing mechanism of FIG. 3.

As seen in FIG. 4, arm clamp 74 is pivotally mounted by an eccentric 84 rotatably driven by air cylinders 78. When the arm clamp is swung from its phantom line position, it pivots on eccentric pin 86 in its phantom line position. Thus as the arm clamp approaches an upright orientation, it is slightly elevated such that foot 80 readily clears the upper channel surface. When a pad 88, carried by the arm clamps, engages the side of a flow channel previously clamped between fences 70 and 72 (FIG. 3), eccentric 84 slips, and pin 86 is propelled downward to its solid line position. This action forcibly depresses arm clamp 74, bringing foot 80 into clamping engagement with the flow channel.

Figure 5:
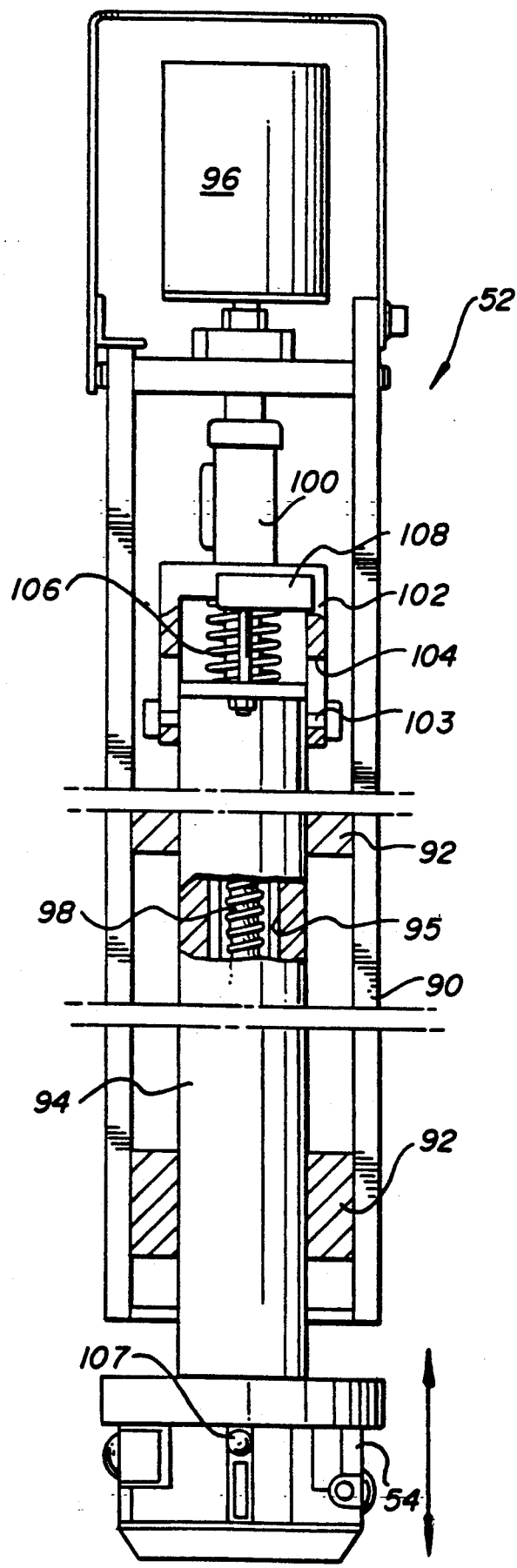
FIG. 5 is an elevational view, partially broken away, of the upper flow channel centering endplug utilized in the apparatus of FIG. 1.

Upper centering mechanism 52, seen in greater detail in FIG. 5, includes a housing 90 affixed to column 16 or strongback 30 (FIG. 1) and containing linear bearings 92 for guiding vertical motion of a post 94 carrying at its lower end upper centering endplug 54. A motor 96 drives a lead screw 98 which extends downwardly through a bore 95 in post 94. A travelling nut 100 engages the lead screw and is connected with the post by a clevis 102 and a clevis pin 103 operating in vertically elongated clevis slots 104. A compression spring 106 acts between clevis 102 and the upper end of post 94 to bias clevis pin 103 to the bottom end of slots 104. When a flow channel is moved into its measurement position by the upender, motor 96 is energized to propel upper centering endplug 54 downwardly into the open upper end of the channel. When the endplug is fully seated therein, a proximity sensor 107 signals motor 96 to stop. Should this proximity sensor fail to stop the motor, a backup proximity sensor 108 detects closure of the gap between the clevis and post 92, as permitted by spring 106 and clevis slots 104, and thereupon issues a motor halting signal.

Figure 6:
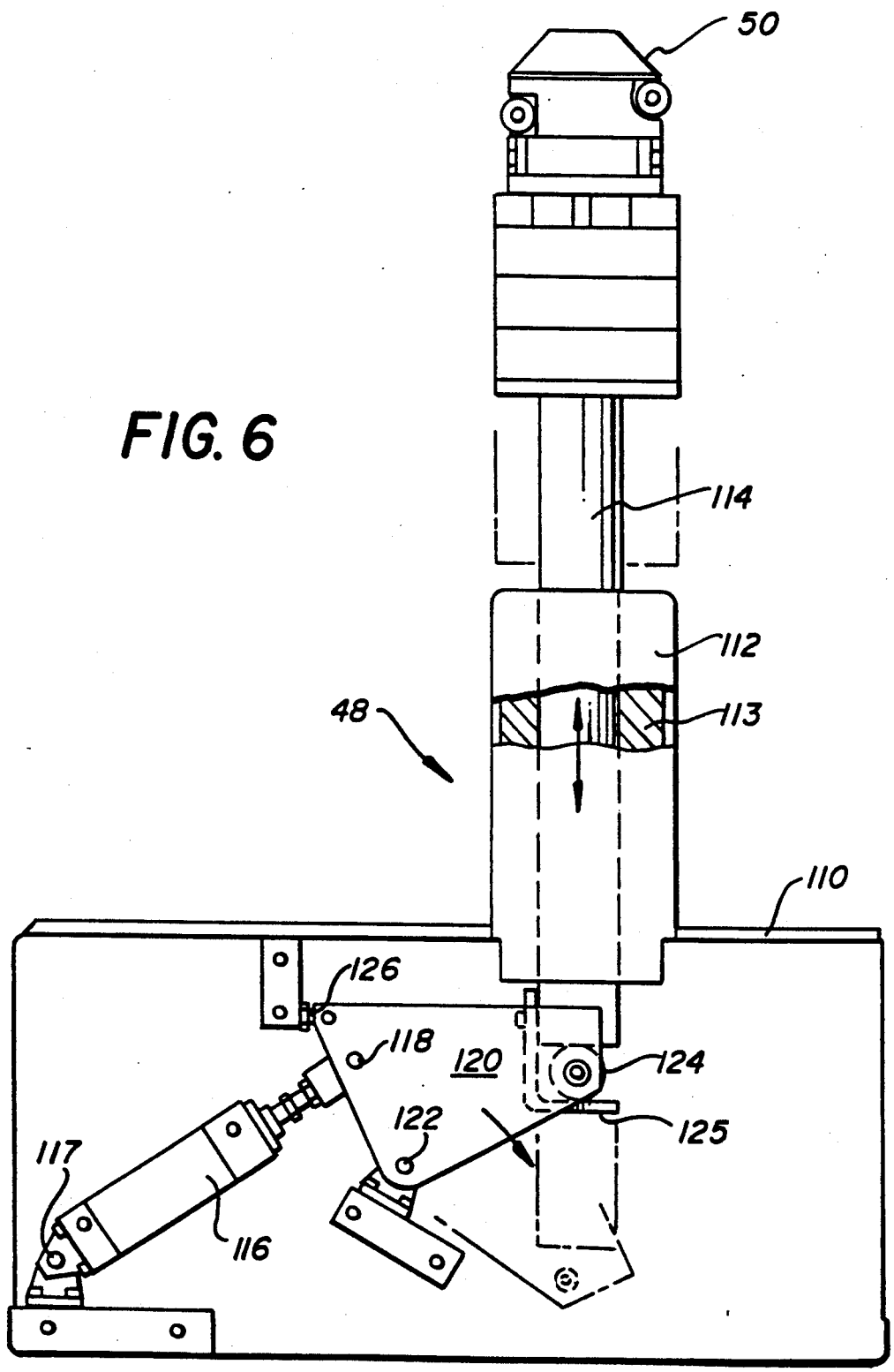
FIG. 6 is a elevational view, partially broken away, of the lower flow channel centering endplug utilized in the apparatus of FIG. 1.

Lower centering mechanism 48, seen in FIG. 6, includes a frame 110 supporting an upstanding hub 112 fitted with a linear bearing 113 slidingly receiving a post 114. Lower centering endplug 50 is affixed to the upper end of post 114. To raise and lower endplug 50, a hydraulic cylinder 116 is pivotally connected to the frame at 117 with its plunger pivotally connected at 118 to an actuating arm 120 also pivotally connected at 122 to the frame. A free end of the actuating arm carries a roller 124 which is captured between the lower end of post 114 and an L-shaped bracket 125 affixed to the post. It is seen that when the hydraulic cylinder plunger is extended, actuating arm 120 is swung to its phantom line position, the lower centering endplug is propelled to its fully retracted position to allow measurement positioning of a flow channel by the upender. The hydraulic cylinder plunger is then retracted to propel the post 114 upwardly to insert the lower centering endplug into seated engagement with the open lower end of the flow channel. This condition is signalled by a proximity sensor 126.

From the foregoing description, it will be appreciated that the present invention provides quality assurance apparatus for dimensionally inspecting elongated components, such as nuclear fuel rod assembly flow channels at the site of their manufacture. It will be understood that a suitable controller (not shown) is utilized to automate the above-described upender and inspection assembly operations on a coordinated basis once a flow channel is manually loaded on the upender boom. Thus, quality assurance inspections can be performed expeditiously with a minimum number of operating personnel.

In view of the foregoing, it is seen that the objects of the invention, including those made apparent from the preceding Detailed Description, are efficiently attained, and, since certain changes may be made in the construction set forth without departing from the scope of the invention, it is intended that all matters of detail be taken as exemplary and not in a limiting sense.

Having described the invention, what is claimed as new and desired to secure by Letter Patent is:

1. Apparatus for measuring the dimensional characteristics of an elongated component, said apparatus comprising in combination:
   A. a column;
   B. an upper centering member affixed in a reference position relative to said column;
   C. a lower centering member affixed in a reference position vertically aligned with said upper centering member;
   D. a measurement carriage supporting at least one dimension sensor and mounted by said column for vertical scanning movement between said upper and lower centering members; and
   E. upender means for accepting the component in a substantially horizontal loading orientation, said upender means operating to manipulate the component into a upright measurement position where it is maintained by subsequent engagements of said upper and lower centering members with the upper and lower end portions, respectively, thereof, whereby, upon scanning movement of said measurement carriage along the length of the component, the dimensional characteristics of the component are obtained by said sensor.

2. The apparatus defined in claim 1, which further includes first means mounting said upper centering member for vertical reciprocation into and out of engagement with the upper end portion of the component and second means mounting said lower centering member for vertical reciprocation into and out of engagement with the lower end portion of the component while being held in said measurement position by said upender.

3. The apparatus defined in claim 2, wherein the component has opposed open ends, and wherein said upper and lower centering members are in the form of plugs insertable into upper and lower open ends, respectively, of the component.

4. The apparatus defined in claim 2, wherein said upender means includes at least one fixturing means for securing the component thereto until engaged by said upper and lower centering members.

5. The apparatus defined in claim 4, wherein said upender means swings the component from said horizontal loading orientation to an upright pre-measurement position, said upender means further includes third means mounting said fixturing means for movement between retracted and extended positions and actuator means for propelling said fixturing means between said retracted and extended positions to laterally shift the component between said pre-measurement position and said measurement position.

6. The apparatus defined in claim 5, wherein the component has opposed open ends, and wherein said upper and lower centering members are in the form of plugs insertable into upper and lower open ends, respectively, of the component.

7. The apparatus defined in claim 5, wherein said upender means further includes a base and a boom pivotally connected adjacent one end to said base, said boom carrying said fixturing means, said third mounting means, and said actuator means.

8. The apparatus defined in claim 7, wherein said fixturing means includes a plurality of clamping elements and actuators for moving said clamping elements into and out of clamping engagements with the component.

9. The apparatus defined in claim 8, wherein said clamping elements include a material covering the component engaging surfaces thereof to prevent marring the component surfaces.

10. The apparatus defined in claim 9 structured to measure the dimensional characteristics of elongated components in the form of flow channels for nuclear fuel rod assemblies.

* * * * *